Nov. 18, 1924.

G. W. OLSON 1,516,056

PISTON RING DRESSING MACHINE

Filed Oct. 19, 1922   2 Sheets-Sheet 1

Inventor:
George W. Olson
By
Attorneys

Nov. 18, 1924.
G. W. OLSON
1,516,056
PISTON RING DRESSING MACHINE
Filed Oct. 19, 1922     2 Sheets-Sheet 2
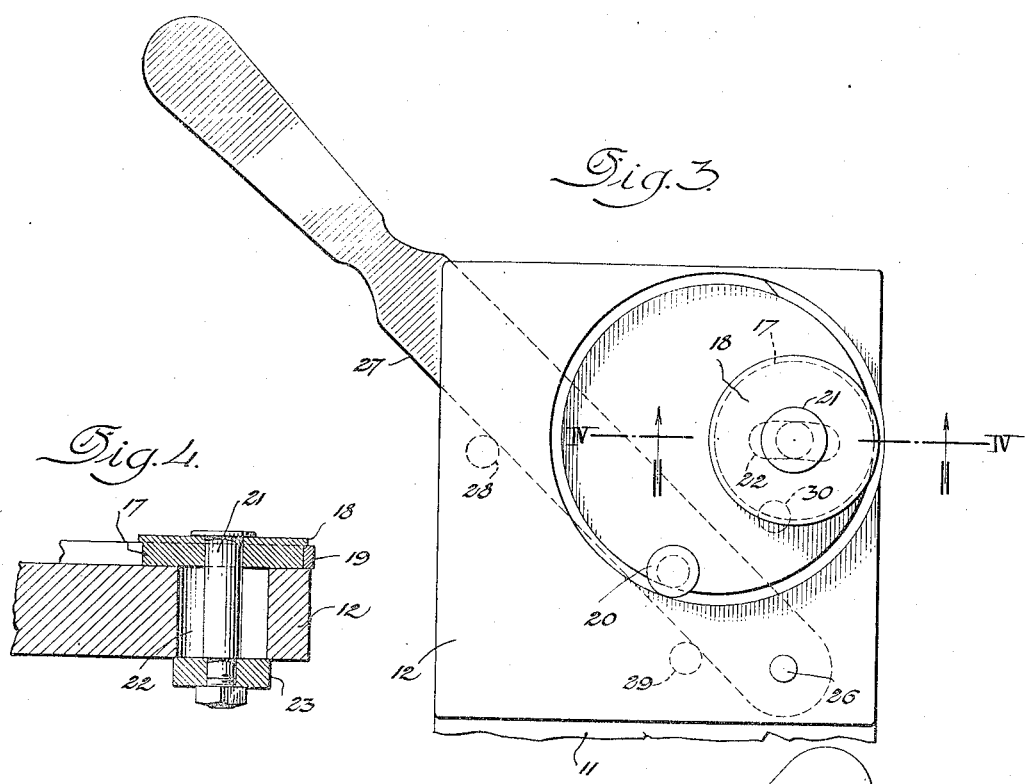
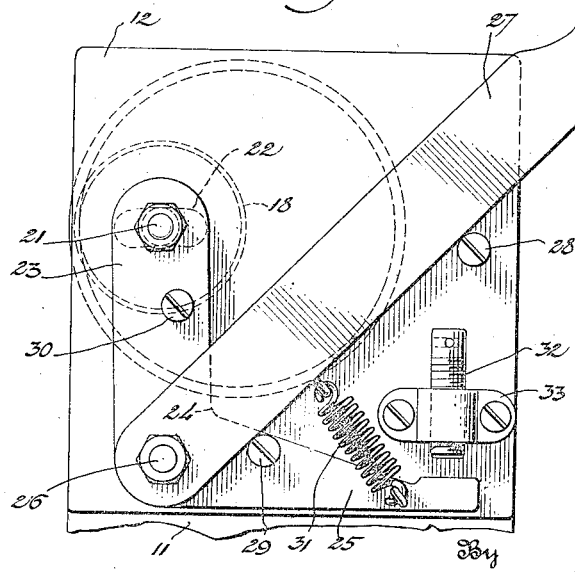
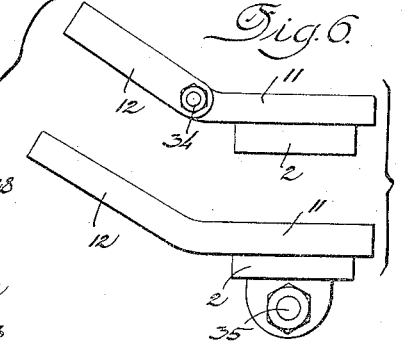
Inventor:
George W. Olson Patented Nov. 18, 1924.

1,516,056

UNITED STATES PATENT OFFICE.

GEORGE W. OLSON, OF MUSKEGON, MICHIGAN, ASSIGNOR TO MUSKEGON PISTON RING CO., OF MUSKEGON, MICHIGAN, A CORPORATION OF MICHIGAN.

PISTON-RING-DRESSING MACHINE.

Application filed October 19, 1922. Serial No. 595,507.

*To all whom it may concern:*

Be it known that I, GEORGE W. OLSON, a citizen of the United States of America, residing at Muskegon, in the county of Muskegon and State of Michigan, have invented certain new and useful Improvements in Piston-Ring-Dressing Machines, of which the following is a specification, reference being had therein to the accompanying drawings.

This invention relates to a piston ring grinding device, and one of the objects of my invention is to provide a device that may be attached to or form part of an ordinary emery wheel stand or grinding machine for adjustably supporting a piston ring or the like relative to the emery wheel or grinding instrumentality, so that the periphery or outer wall of the piston ring may have protuberances or irregular surfaces removed or ground down to within reasonable or workable limits.

Another object of my invention is to provide a work holder for a grinding machine which will permit of piston rings and other pieces of work being ground to remove uneven surfaces or high spots and thus prepare the rings for further operations, for instance fine finishing and dressing, although such operations may be carried on by my ring grinding machine when the grinding instrumentality is of such a nature as to properly finish the piston or rings. I aim to take a rough piston ring casting, as it comes from the foundry and so grind the ring that the thickness may be maintained within predetermined limits, and by my machine such grinding can be expeditiously and economically carried on so as to increase production.

A further object of my invention is to provide a work holder adjustably supported to a grinding wheel and adapted for holding a piece of work relative to the wheel so that its frictional contact with the wheel will cause the work to be revolved or shifted and become evenly ground. The adjustability of the work holder permits of the piece of work being moved transversely of the wheel grinding surface so that a grinding wheel may have its whole face or a portion of its side wall evenly worn, thus insuring a uniform surface on the grinding wheel and lengthening the time intervals of dressing the grinding wheel.

A still further object of my invention is to provide a work holder and means thereon for yieldably supporting a movable piece of work relative to a grinding, finishing or dressing instrumentality, said means including a manually actuated lever or member by which greater pressure may be brought to bear by the piece of work on the grinding instrumentality, and provision is made to limit such manual pressure so that a piece of work cannot be excessively operated upon.

The above are a few of the objects attained by my invention and others will appear as the nature of the invention is better understood by aid of the drawings, the detail description and the appended claims.

In the drawings,

Fig. 3 is a top plan of a portion of the work holder with a piston ring or piece of work thereon;

Fig. 4 is a cross sectional view taken on the line IV—IV of Fig. 3.

Fig. 5 is a bottom plan of that portion of the work holder shown in Fig. 3, and

Fig. 6 shows diagrammatic views of adjustable work holders.

Figure 1:
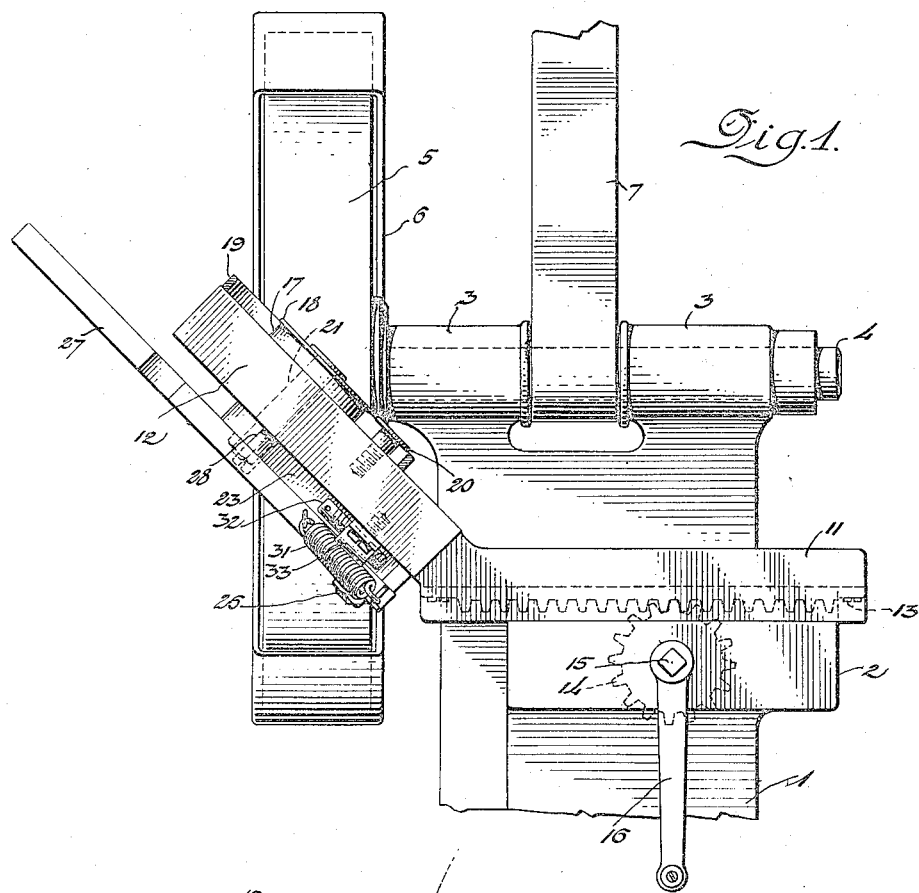
Figure 1 is a front elevation of a portion of an emery wheel stand or grinding machine provided with a work holder in accordance with my invention.

In the drawings, the reference numeral 1 denotes, by the way of an example, a machine stand or pedestal provided with a knee or bracket 2 and bearings 3 for a driven shaft 4 supporting an emery wheel 5 or other grinding, finishing, dressing or abrading instrumentalities which may be partially incased or provided with a guard 6. The shaft 4 may be driven by a belt 7, a motor or from a suitable source of power.

The knee 2 is longitudinally bifurcated or provided with a slot 8, and the upper face of said knee has a longtitudinal dove-tail tongue 9 extending into a dove-tail groove or way 10 in the lower face of the leg or base 11 of an angularly disposed work holder 12. In the groove or way 10 of the base 11 is a longitudinal rack 13 extending into the slot 8 and meshing with a pinion 14 mounted on a shaft 15 journaled in the knee or bracket 2. On the forward end of the shaft 15 is a crank 16, wheel or hand member which permits of the shaft 15 being rotated or rocked to reciprocate the base or carriage 11 on the knee or bracket 2. The work holder 12 is disposed at an obtuse angle relative to the base or carriage 11 and at an angle to the plane of rotation of the wheel 5 and since the base or carriage 11 is shiftable the work holder 12 may be moved back and forth across the peripheral face of the grinding wheel 5.

Figure 2:
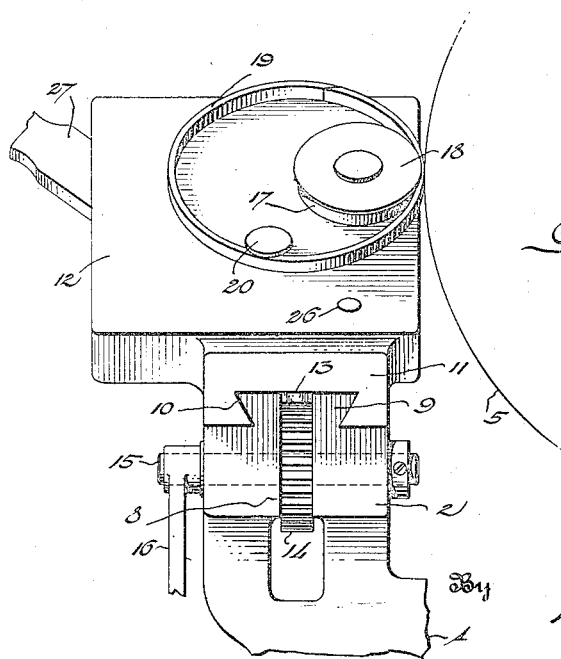
Fig. 2 is a side elevation of the same.

On the upper face of the work holder 12, at that edge of the work holder contiguous to the wheel 5, is a rotatable guide wheel 17 having its upper face provided with a head or overhanging peripheral flange 18 which cooperates with the upper face of the work holder 12 in forming a channel at the edge of the work holder, so that a piston ring 19, annulus or other circular member may be placed on the work holder 12 and held in engagement with the peripheral face of the wheel 5 by the guide wheel 17, which is shiftable on the work holder. As best shown in Figs. 2 and 4 the outer wall of the piston ring 19 is beyond the edge of the work holder 12 and in position to contact with the wheel 5 and for the piston ring to be turned or rotated thereby. The piston ring 19 has been shown as the ordinary and well known split type but it is obvious that this piston ring is simply an example of various kinds of articles or pieces of work that may be supported by the work holder 12 and subjected to the action of the wheel 5.

Cooperating with the large guide wheel 18 is a small guide wheel or stud 20 positioned to engage an inner wall of the piston ring to prevent crawling or creeping of the piston ring, other than in a circumferential direction, on the work holder 12 due to the action of the wheel 5.

The large guide wheel 17 has a spindle 21 extending through the slot 22 in the work holder 12 and the lower end of the spindle 21 is mounted in the outer end of an arm 23 forming part of a bell crank 24 which has another arm 25 substantially at a right angle to the arm 23. The bell crank 24 is pivotally supported on the lower face of the work holder 12 by a nut equipped stud or post 26 which also serves as a pivot for a lever 27 adapted to be manually operated.

One edge of the lever 27 normally engages stops or studs 28 and 29, the former being carried by the work holder 12 and the latter by the arm 25 of the bell crank 24. The opposite edge of the lever 27 may engage a stop or stud 30 carried by the arm 23 of the bell crank 24.

The lever 27 is connected to the bell crank arm 25 by a coiled retractile spring 31 and adjacent the end of the bell crank arm 25 is an adjustable micrometer screw 32 mounted in a holder or bearing 33 on the lower face of the work holder 12. This micrometer screw serves as a stop for the bell crank arm 25 and said screw may be adjusted to limit the extreme movement of the bell crank.

With the shiftable guide wheel 17 in a retracted position the piston ring 19 can be placed on the work holder 12, over the guide wheels 17 and 20 and confronting the grinding face of the wheel 5 to be operated upon by said wheel. By shifting the lever 27 away from the stop 28 and towards the stop 30 of the bell crank said bell crank will be shifted because of the yieldable spring connection between the lever 27 and the bell crank arm 25. This movement of the bell crank 24 causes the guide wheel 17 to shift the outer wall of the piston ring 19 into frictional engagement with the periphery of the wheel 5 and such contact causes the piston ring 19 to be rotated about its center by the wheel 5. The entire surface of the outer wall of the ring will be subjected to the abrading action of the wheel 5 and any roughness made smooth so that such wall will be uniform throughout. The degree of grinding depends on the time the piston ring is subjected to the wheel 5, on the amount of pressure placed against the piston ring by the spring 31 or the lever 27, and the angularity of the work holder 12 relative to the wheel. Excessive pressure is prevented by the micrometer screw 32, and during the grinding operation the base or carriage 11 may be shifted to carry the piston ring transversely of the peripheral face of the wheel 5 so that said wheel may be evenly worn and thus reduce to a minimum the resurfacing or dressing which such wheels occasionally require.

During the grinding operation should any indurate or hardened protuberance be encountered on the cast surface of the piston ring the spring 31 will allow the bell crank to shift and the piston ring to recede relative to the grinding wheel, thus permitting of such protuberance being gradually ground off without subjecting the grinding wheel to excessive wear.

Since the speed at which the piston ring 19 revolves may be governed by the angularity of the work holder 12 relative to the grinding wheel 5, I may make the work holder 12 adjustable so that its angularity relative to the wheel 5 may be changed. For instance, instead of making the work holder and base 11 integral I may adjustably connect the work holder 12 to the base 11 as at 34 in Fig. 6. Then again, I may make the knee or bracket 2 adjustable relative to the stand or pedestal 1, as at 35 in Fig. 6; the views of this figure being more or less diagrammatic and simply indicating what I may do with my machine attachment when it becomes necessary to use a work holder that is more or less universal and adapted for other than the grinding of piston rings.

What I claim is:—

1. Means for supporting a piston ring relative to a grinding wheel, comprising a reciprocatory base, a work holder thereon a shiftable guide wheel on said work holder adapted for yieldingly holding a piston ring against said grinding wheel so that said piston ring may be revolved about its center by said grinding ring to have its outer wall ground, and an adjustable bell crank articulated with said guide wheel for shifting said guide wheel.

2. Means for supporting a piston ring relative to a grinding wheel as called for in claim 1, wherein said means includes a guide wheel, a bell crank adapted to shift said guide wheel, a lever, and a spring connecting said lever to said bell crank.

3. Means for supporting a piston ring relative to a grinding wheel to be ground thereby, comprising an adjustable base, a work holder carried by said base and disposed at an angle to the plane of rotation of said grinding wheel so that the piston ring may be revolved thereby, a shiftable piston ring guide on said work holder manually actuated means of adjusting said base, and manually actuated means adapted for shifting said guide on said work holder.

4. Means for supporting a piston ring relative to a grinding wheel to be ground thereby as called for in claim 3, wherein the first mentioned means includes a rack and pinion, and the last mentioned means includes a spring and bell crank.

5. Means for supporting a piston ring relative to a grinding wheel to be ground thereby, said means comprising a work holder, a guide wheel on one face of said work holder adapted to hold a piston ring against the grinding wheel, a bell crank pivoted on the other face of said work holder and articulated with said guide wheel for shifting said wheel, a lever pivoted on said work holder adapted for shifting said bell crank, a spring connecting said bell crank and said lever, and means on said work holder to limit the movement of said bell crank.

6. Piston ring supporting means as called for in claim 5, wherein said work holder is disposed at an angle to the grinding wheel so that the piston ring may be revolved by contact with said grinding wheel.

7. Piston ring supporting means as called for in claim 5, wherein said means includes stops for said lever and a micrometer stop for said bell crank.

In testimony whereof I affix my signature in presence of two witnesses.

GEORGE W. OLSON.

Witnesses:
 KARL K. BUTLER,
 ANNA M. DORR.